United States Patent

Chrobak

[11] 3,989,083
[45] Nov. 2, 1976

[54] TIRE WITH SPECIALLY DESIGNED MULTIPLE CARCASS PLIES

[75] Inventor: Dennis S. Chrobak, Cuyahoga Falls, Ohio

[73] Assignee: The Goodyear Tire & Rubber Company, Akron, Ohio

[22] Filed: June 24, 1974

[21] Appl. No.: 482,051

[52] U.S. Cl. .............................. 152/354; 152/361 R
[51] Int. Cl.² ......................................... B60C 9/06
[58] Field of Search ................. 152/354, 355–359, 152/361 R

[56] References Cited
UNITED STATES PATENTS

| | | | |
|---|---|---|---|
| 778,496 | 12/1904 | Marks | 152/355 |
| 1,374,505 | 4/1921 | Hopkinson | 152/356 X |
| 1,493,674 | 5/1924 | Hopkinson | 152/355 |
| 1,616,069 | 2/1927 | Tuttle et al. | 152/357 R X |
| 2,006,315 | 6/1935 | Hopkinson | 152/356 |
| 2,432,630 | 12/1947 | Purdy | 152/356 |
| 3,299,934 | 1/1967 | Pace | 152/354 |
| 3,311,152 | 3/1967 | Marzocchi et al. | 152/357 R X |
| 3,452,800 | 7/1969 | Kline, Jr. | 152/356 |

Primary Examiner—Robert B. Reeves
Assistant Examiner—Charles A. Marmor
Attorney, Agent, or Firm—F. W. Brunner; H. E. Hummer

[57] ABSTRACT

A tire for a racing vehicle characterized by multiple carcass plies in which both tension and shear stresses are shared equally by the carcass plies and cord reinforcements of the plies, this being accomplished by varying the pathways and end counts of the reinforcement cords from ply-to-ply and the gauge of the plies.

7 Claims, 2 Drawing Figures

TIRE WITH SPECIALLY DESIGNED MULTIPLE CARCASS PLIES

BACKGROUND OF THE INVENTION

This invention is particularly well suited for multiple ply tires, especially tires used on racing vehicles where the tires are individually tailored to the specific characteristics of the car such as its weight and speed. The tires of racing vehicles play an important role in winning races. The designers of such tires strive to produce the most efficient tire for the particular vehicle involved. Translated to actual performance, this means, for example, that in races like the Indianapolis 500, each tire of the vehicle is individually designed and differs from the other tires. The most efficient tire is generally thought of as having the best characteristics of, for example, size, weight, load-carrying capacity, and operating speed requirements. It has been found that the most efficient tire is produced by providing carcass plies and cord reinforcements which equally share both tension and shear stresses. The invention is directed to such a tire.

Briefly stated, the invention is in a tire comprising a plurality of carcass plies surrounded by a tread and sidewalls terminating at a pair of beads. The carcass plies are each characterized by (I) a higher end count per inch of reinforcement cords than of the next adjacent carcass ply closer the tread, (II) a smaller gauge of rubbery material than that of the next adjacent carcass ply closer the tread, and (III) lower reinforcement cord angles, measured relative to the centerplane of the tire, than those of the next adjacent carcass ply closer the tread, such that the cords of the carcass plies are uniformly stressed when the tire is mounted on a wheel rim and inflated to the normal inflation pressure recommended by the manufacturer of the tire.

DESCRIPTION OF THE DRAWING

The following description of the invention will be better understood by having reference to the annexed drawing, wherein.

THE INVENTION

Figure 1:
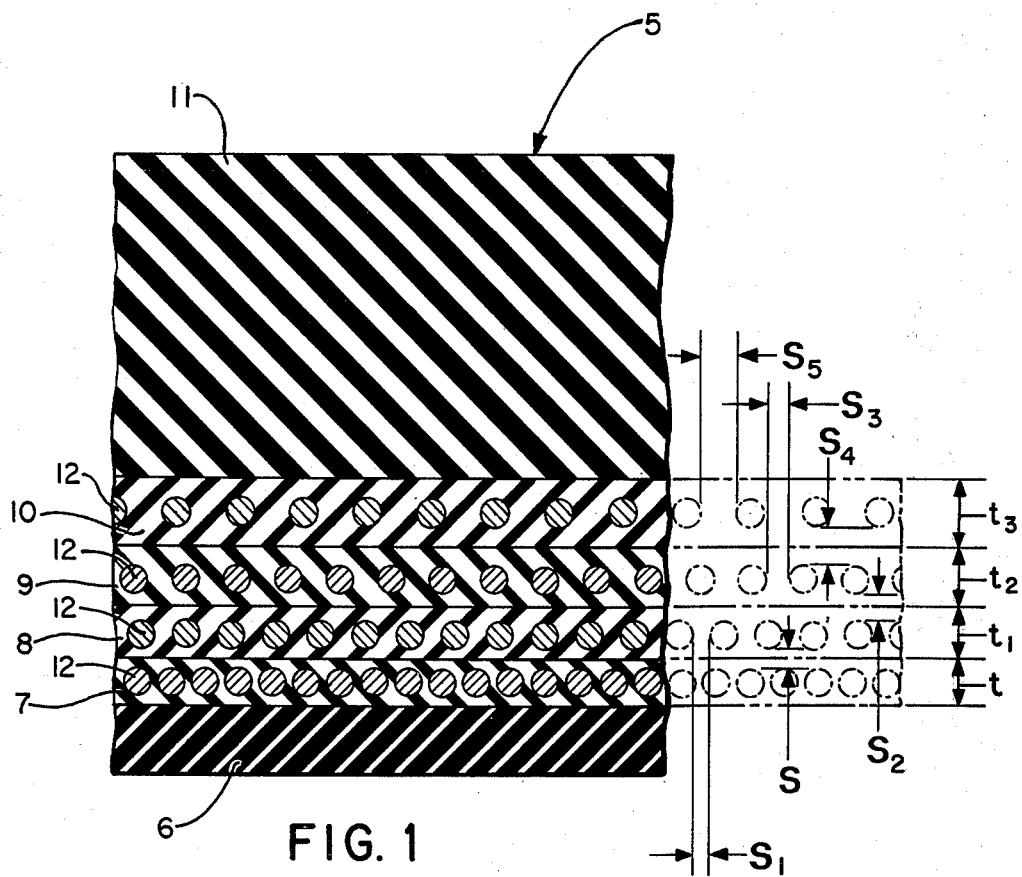
FIG. 1 is an enlarged section taken in the tread area of a racing tire made in accordance with the invention.
Figure 2:
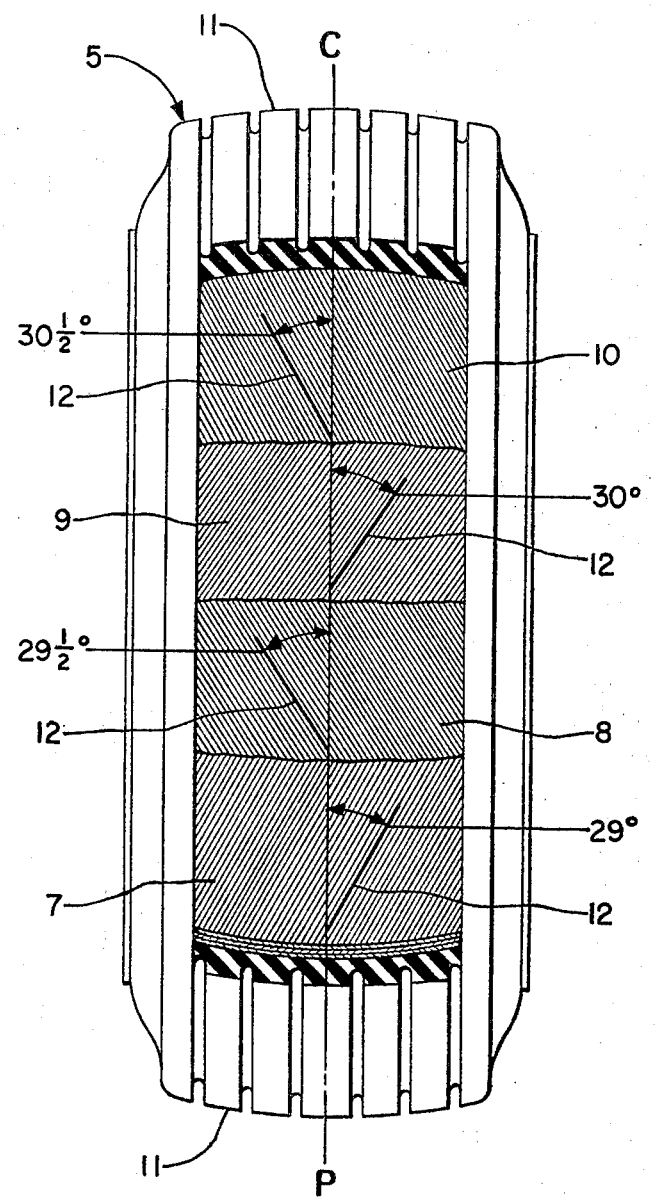
FIG. 2 is a plane view of the tread with a portion thereof removed to show the cord angle relationship of the various carcass plies.

The racing tire 5, shown in the drawing, comprises the essential components of a fluid impervious innerliner 6; a plurality of carcass plies 7–10 surrounding the innerliner 6; and a tread 11 and pair of sidewalls (not shown) surrounding the carcass plies 7–10 and terminating at a pair of annular beads (also not shown). The carcass plies 7–10 are each reinforced by a number of parallel cords 12 which, in this case, are identical 840's/2 having an overall diameter, or gauge of .021 inches.

The carcass plies 7–10 and reinforcement cords 12 are designed to equally share the stresses of tension and shear. The tension in the cords 12 of the various plies 7–10 is equalized by using different cord angles in the various plies, such that the pathways of all the cords between the tire beads are equal in length. The forces of shear are equalized in the different plies 7–10 by varying the end count of the reinforcement cords 12 and gauge, or thickness of rubbery material surrounding the cords 12 and forming the plies 7–10. The end count of the reinforcement cords 12 varies from ply-to-ply, the innermost ply 7 closest the innerliner 6 having the largest end count, and the outermost ply 10 closest the tread 11 having the smallest end count.

A good racing tire 5 was built from four carcass plies wherein the innermost ply 7 was reinforced by 840's/2 cords with an end count of 35 cords per inch, the next or second innermost ply 8 was reinforced by 840's/2 cords with an end count of 29 cords per inch, the next succeeding or second outermost ply 9 was reinforced by 840's/2 cords with an end count of 24 cords per inch, and the outermost ply 10 was reinforced by 840's/2 cords with an end count of 18 cords per inch. The gauge, or thickness of the rubbery material of each succeeding carcass ply of the tire 5, was made greater starting with the innermost ply 7 which had an overall thickness $t$ or gauge of .026 inches. The next innermost ply 8 had a gauge $t_1$ of .028 inches, the next to outermost ply 9 had a gauge $t_2$ of .032 inches, and the outermost ply 10 had a gauge $t_3$ of .036 inches. It is preferable that the spacing between the cords 12 of adjacent plies be equal to the spacing between the cords 12 of the ply closest the tread 11. Thus, for example, using the aforementioned cord and carcass ply dimensions, the spacing $s$ between the cords 12 of the innermost adjacent plies 7 and 8 is .006 inches which is the spacing $s_1$ between the cords 12 of the second innermost ply 8. The spacing $s_2$ between the cords 12 of the next pair of adjacent plies 8 and 9 is .009 inches which is the spacing $s_3$ between the cords 12 of the second outermost ply 9, and the spacing $s_4$ between the cords 12 of the next succeeding pair of adjacent plies 9 and 10 is .013 inches which is the spacing $s_5$ between the cords 12 of the outermost ply 10. Thus, it can be appreciated that the gauge of rubbery material increases from the innermost ply 7 to the outermost ply 10, whereas the end count of the reinforcement cords 12 decreases from the innermost ply 7 to the outermost ply 10.

The cord angles of the reinforcement cords 12 are measured at, and in relation to a plane CD containing, the mid-circumferential centerline of the tread 11, such plane being referred to as the centerplane, and vary from ply-to-ply such that the pathways of all the reinforcement cords 12 of the carcass plies 7–10 are substantially equal, in length, between the beads of the tire 5. For example, the reinforcement cords 12 of the innermost ply 7, indicated above, were disposed at like angles of 29°, whereas the reinforcement cords 12 of the second innermost ply 8 were disposed at like angles of 29½°, the reinforcement cords 12 of the second outermost ply 9 were disposed at like angles of 30°, and the reinforcement cords 12 of the outermost ply 10 were disposed at like angles of 30½°, all angular measurements being in relation to the centerplane of an uninflated tire.

Thus, there has been described a tire in which the carcass plies and their reinforcement cords are designed to equally share the tension and shearing stresses on the tire. As previously indicated, the cord tension is equalized at all ply levels by angular changes between the cords of adjacent plies. The number of cords are at a level to meet the maximum load requirements. Further, the cord count in each of the plies is varied to keep the shear levels at a minimum, and the gauge of rubbery material surrounding the cords is heavier on the outer plies to produce a higher rubber-to-fabric ratio in the succeeding plies measured from the innermost to the outermost plies.

While certain representative embodiments and details have been shown for the purpose of illustrating the invention, it will be apparent to those skilled in the art that various changes and modifications may be made therein without departing from the spirit or scope of the invention.

What is claimed is:

1. A tire comprising a plurality of carcass plies surrounded by a tread and sidewalls terminating at a pair of beads and characterized in that each carcass ply has:
   a. a higher end count per inch of reinforcement cords than that of the next adjacent carcass ply closer the tread;
   b. a smaller gauge of rubbery material than that of the next adjacent carcass ply closer the tread; and
   c. lower reinforcement cord angles, measured relative to the centerplane of the tire, than those of the next adjacent carcass ply closer the tread, the gauge of rubbery material of the carcass plies and the end count and cord angles of the reinforcement cords of the carcass plies being such that the reinforcement cords of the carcass plies are uniformly stressed when the tire is mounted on a wheel rim and inflated to the normal inflation pressure recommended by the manufacturer of the tire.

2. The tire of claim 1, wherein the pathways of the reinforcement cords of the carcass plies between the beads are substantially equal in length.

3. The tire of claim 1, including at least four carcass plies.

4. The tire of claim 3, wherein the reinforcement cords of the carcass plies are in the range of from 25° to 35° measured in relation to the centerplane of the tire, when uninflated.

5. The tire of claim 3, wherein the reinforcement cords of the carcass plies are identical and have the same overall diameter.

6. The tire of claim 1, wherein the spacing between the reinforcement cords of a pair of adjacent plies is equal to the spacing between the cords of the adjacent ply closer the tread of the tire.

7. The tire of claim 1, which includes a fluid impervious innerliner covering the innermost carcass ply of the tire.

* * * * *